United States Patent
Zhang et al.

(10) Patent No.: US 9,857,125 B2
(45) Date of Patent: Jan. 2, 2018

(54) DENITRATION AND WASTE HEAT RECOVERY INTEGRATED FURNACE

(71) Applicant: CAS SUPER ENERGY TECHNOLOGY JINGJIANG LTD., Jingjiang, Jiangsu (CN)

(72) Inventors: Xinyu Zhang, Jiangsu (CN); Fengjiao Zhang, Jiangsu (CN); Wei Wu, Jiangsu (CN); Qian Zhao, Jiangsu (CN)

(73) Assignee: CAS SUPER ENERGY TECHNOLOGY JINGJIANG LTD., Jingjiang, Jiangsu (CN)

( * ) Notice: Subject to any disclaimer, the term of this patent is extended or adjusted under 35 U.S.C. 154(b) by 106 days.

(21) Appl. No.: 15/038,838

(22) PCT Filed: Nov. 12, 2014

(86) PCT No.: PCT/CN2014/090858
§ 371 (c)(1),
(2) Date: May 24, 2016

(87) PCT Pub. No.: WO2016/045172
PCT Pub. Date: Mar. 31, 2016

(65) Prior Publication Data
US 2017/0160013 A1    Jun. 8, 2017

(30) Foreign Application Priority Data
Sep. 24, 2014 (CN) .......................... 2014 1 0492723

(51) Int. Cl.
*B01D 50/00* (2006.01)
*F27D 17/00* (2006.01)
*B01D 53/86* (2006.01)

(52) U.S. Cl.
CPC ......... *F27D 17/002* (2013.01); *B01D 53/869* (2013.01); *B01D 53/8609* (2013.01);
(Continued)

(58) Field of Classification Search
CPC .. B01D 53/501; B01D 53/8625; B01D 53/62; B01D 2255/1023; B01D 2255/2073; F27D 17/002
(Continued)

(56) References Cited

U.S. PATENT DOCUMENTS 5,988,080 A * 11/1999 Miyoshi ................ F01K 23/067
110/216
6,027,697 A * 2/2000 Kurihara ............ B01D 53/8625
422/171
(Continued)

FOREIGN PATENT DOCUMENTS

CN    102292303 A    12/2011
CN    102997697 A    3/2013
(Continued)

*Primary Examiner* — Tom P Duong
(74) *Attorney, Agent, or Firm* — Novick, Kim & Lee, PLLC; Allen Xue

(57) ABSTRACT

The present invention relates to a denitration and waste heat recovery integrated furnace, comprising a denitration system, a desulfurization system and a waste heat recovery system. An air outlet of the denitration system is connected to an inlet of a dust collector (4), an outlet of the dust collector (4) is connected to an air inlet of the desulfurization system, an air outlet of the desulfurization system is connected to an air compressor (6) of the waste heat recovery system, and the waste heat recovered by the air compressor (6) is used for heat energy utilization of other departments.

6 Claims, 1 Drawing Sheet

(52) U.S. Cl.
CPC .. *B01D 53/8625* (2013.01); *B01D 2255/1023* (2013.01); *B01D 2255/2073* (2013.01); *B01D 2255/20738* (2013.01)

(58) Field of Classification Search
USPC ............ 422/168, 171; 60/274; 110/190, 216
See application file for complete search history.

(56) References Cited

U.S. PATENT DOCUMENTS

| | | | | |
|---|---|---|---|---|
| 6,638,485 | B1 * | 10/2003 | Iida ..................... | B01D 53/501 423/210 |
| 2009/0272300 | A1 * | 11/2009 | Yamada ................ | F22B 35/002 110/190 |
| 2013/0327025 | A1 * | 12/2013 | Shimamura ............ | B01D 53/62 60/274 |
| 2015/0086457 | A1 * | 3/2015 | Kagawa ................ | B01D 53/64 423/239.1 |

FOREIGN PATENT DOCUMENTS

| | | | |
|---|---|---|---|
| CN | 103900391 | A | 7/2014 |
| CN | 204255110 | U | 4/2015 |
| JP | 2003164726 | A | 6/2003 |

\* cited by examiner

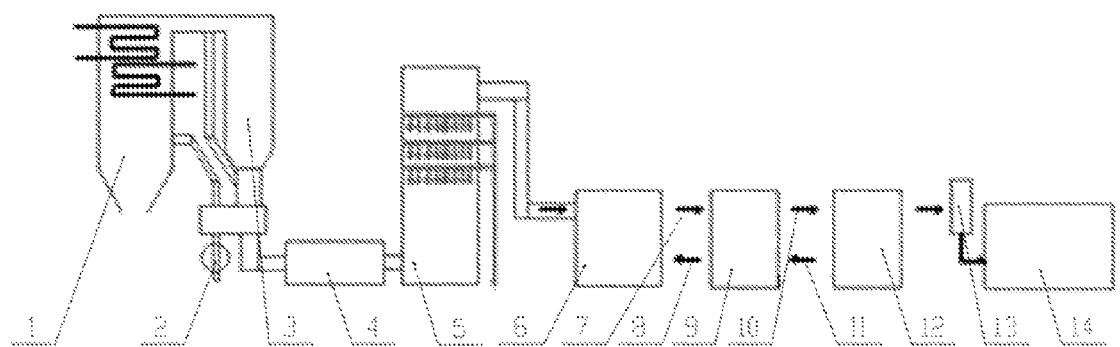

DENITRATION AND WASTE HEAT RECOVERY INTEGRATED FURNACE

TECHNICAL FIELD OF THE INVENTION

The present invention relates to an industrial furnace and in particular to a denitration and waste heat recovery integrated furnace, applicable to apparatus design, manufacture and application of chemical, petrochemical and mechanically industrial furnaces.

BACKGROUND OF THE INVENTION

With the development of industrial production, the pollution caused by fossil fuel is posing a growing threat to the living environment of human beings. NOx is another main source of atmospheric pollution, second only to SOx, and also the main cause of formation of acid rain and photochemical smog. It was noted by the China Environmental Report that the total emission of NOx in 2011 is 24.043 million tons, and 23.378 million in 2012, slightly lower than that in 2011. Control and treatment of NOx pollution are urgently needed. At present, selective catalytic reduction (SCR) is the mainstream technique for flue gas denitration in the world. However, the apparatuses are expensive; the investment cost is high, particularly the cost of catalysts takes 30% to 60% of the initial investment cost of the whole system; and the subsequent replacements caused by abrasion and contamination of the catalysts are even more costly. Due to the addition of an SCR device, the on-way resistance, partial resistance, and resistance caused by the catalysts are increased, the power consumption of the draft fan is increased, the negative pressure rises, and the wear is increased correspondingly; furthermore, the heat loss is increased, and the overall efficiency is decreased somewhat.

There are many types of waste gases in the waste gas generated in the boiler. Among those waste gases, sulfur- and nitrogen-containing compounds are most seriously harmful to human beings.

Acid rain and photochemical smog will be formed when those gases enter the air, thereby seriously destroying the ecological environment and resulting in huge economical loss.

The energy utilization efficiency in China is only 33%, which is 10% lower than that in the developed countries. The waste heat resource takes about 17% to 67% of the total amount of fuel consumption. Since the combustion of fossil fuel will generate a great of nitrogen oxides, the mass formation of acid rain will be caused. In order to effectively treat the pollutants to protect the ecological environment, denitration has become a very important industry technique. At the later stage of denitration, a very large amount of heat will be generated in the denitration furnace, and since the flue gas containing a very large amount of heat is exhausted to the atmosphere without being utilized, the heating efficiency of the boiler is decreased and the coal consumption of power generation is increased.

SUMMARY OF THE INVENTION

An objective of the present invention is to provide a denitration and waste heat recovery integrated furnace, which can achieve waste heat recovery and can fully utilize the recovered waste heat while denitrating, to solve the technical problem mentioned above.

The present invention employs the following technical solution to achieve this purpose. A denitration and waste heat recovery integrated furnace is provided, including a denitration system, a desulfurization system and a waste heat recovery system, the denitration system includes a boiler, an air pre-heater and a denitration device; the desulfurization system includes a desulfurization device; and in the waste heat recovery system, an air compressor is connected to a water heater, the water heater is connected to a stainless steel cyclical water tower, and the stainless steel cyclical water tower is connected to an end use through a dual-layer insulating water tower.

The boiler in the denitration system is connected to the air pre-heater to allow for heat exchange between flue gas and air, for a purpose of adjustment and control of temperature of the flue gas; and the boiler is also connected to the denitration device in which a denitration process is used.

An air outlet of the denitration system is connected to an inlet of a dust collector, and an outlet of the dust collector is connected to an air inlet of the desulfurization system.

In the desulfurization device of the desulfurization system, a dry desulfurization process and a wet desulfurization process are used.

Hot water from an outlet of the stainless steel cyclical water tower first enters the dual-layer insulating water tower and is then used for the end use (14).

Tap water at an inlet of the stainless steel cyclical water tower is connected to the air compressor through the water heater, heat generated by the air compressor is absorbed by a lubricant, and the high-temperature lubricant transfers heat to and heats the tap water.

The denitration and waste heat recovery integrated furnace of the present invention is reasonable in design, stable in operation, and novel in concept; as a typical innovation in response to the government calls on energy conservation, it is exploitable, utilizable and expandable, and is environmentally friendly and energy saving; waste heat may be recovered while denitrating and the production cost is reduced; and the popularization and application of such a furnace have great economic and social benefits.

The technology has the following advantages:

(1) heat energy generated by reactions is recovered by an air compressor and then used in other purposes, so as to realize the effect of energy recovery;

(2) intensive and lean technical route: by optimizing the plan by utilizing a self-innovated multi-parameter technology, screening and organizing an optimal denitration and desulfurization technical route according to the investment scale of customers and the existing processes, the investment cost of projects is reduced by 15% to 50% and the running cost is reduced by 10% to 40%;

(3) low-temperature oxidation catalysts have high activity, good stability and low cost;

(4) the operating conditions are mild and easily controllable, the operating temperature is lower than 150° C., and energy waste caused by secondary heating in the general processes and the severe requirements on engineering materials are effectively solved;

(5) NOx<100 mg/m$^3$, SOx<200 mg/m$^3$, Hg<0.05 mg/m$^3$, dust<30 mg/m$^3$, the process integration degree is high, the operation is easy, and the repeated construction is avoided, and the national standards are met; and (6) this device can recover waste heat, thereby saving energy resources.

BRIEF DESCRIPTION OF THE DRAWINGS

FIG. 1 is a schematic structure diagram of the present invention, in which:

1: boiler;
2: air pre-heater;
3: denitration device;
4: dust collector;
5: desulfurization device;
6: air compressor;
7: high-temperature lubricant;
8: low-temperature lubricant;
9: water heater;
10: hot water;
11: tap water;
12: stainless steel cyclical water tower;
13: dual-layer insulating water tower; and
14: end use.

DETAILED DESCRIPTION OF THE INVENTION

The present invention will be further described below with reference to the accompanying drawings, but this description is not intended to limit the present invention.

A denitration and waste heat recovery integrated furnace is provided, including a denitration system, a desulfurization system and a waste heat recovery system, the denitration system includes a boiler 1, an air pre-heater 2 and a denitration device 3; the desulfurization system includes a desulfurization device 5; and in the waste heat recovery system, an air compressor 6 is connected to a water heater 9, the water heater 9 is connected to a stainless steel cyclical water tower 12, and the stainless steel cyclical water tower 12 is connected to an end use 14 through a dual-layer insulating water tower 13. The boiler 1 in the denitration system is connected to the air pre-heater 2 to allow for heat exchange between flue gas and air, for a purpose of adjustment and control of temperature of the flue gas; and the boiler 1 is also connected to the denitration device 3 in which a denitration process is used. An air outlet of the denitration system is connected to an inlet of a dust collector 4, and an outlet of the dust collector 4 is connected to an air inlet of the desulfurization system. In the desulfurization device 5 of the desulfurization system, a dry desulfurization process and a wet desulfurization process are used. Hot water from an outlet of the stainless steel cyclical water tower 12 first enters the dual-layer insulating water tower 13 and is then used for the end use 14. Tap water at an inlet of the stainless steel cyclical water tower 12 is connected to the air compressor 6 through the water heater 9, heat generated by the air compressor 6 is absorbed by a lubricant, and the high-temperature lubricant 7 transfers heat to and heats the tap water 11.

During specific implementation, the present invention has the following process flow:

(1) singlet oxygen atoms are generated from $H_2O_2$ and $O_2$ in the presence of a specific catalyst, wherein the catalyst includes noble metal Pd-based catalyst, $FeCl_3$, $MnO_2$, $Fe_2O_3$, catalase or the like; and the desired catalyst is put in the denitration device 3 and the desulfurization device 5;

(2) the sulfur- and nitrogen-containing gas generated in the boiler 1 reacts, in the presence of catalyst, with the singlet oxygen atoms generated by the catalyst when flowing through the pipe, this reaction can achieve the purposes of both denitration and desulfurization so that the harmful gas generates by-products such as nitric acid and sulfuric acid; since the reaction temperature does not reach 100° C., this reaction catalyst is good in stability; furthermore, the activity of the catalyst is controllable to achieve the expected effect, and the resulting product may be reused by a separation technique;

(3) when passing the sulfur- and nitrogen-containing gas generated in boiler 1 through the air pre-heater 2, the resulting gas is cooled, so that the loss in the furnace is reduced, the temperature of the exhausted smoke is reduced, and the heating efficiency of the boiler is improved;

(4) gas generated by reaction is gathered by the dust collector 4 and then enters the desulfurization device 5, and the catalyst and treatment process thereof are as described in (1); the desulfurization device 5 can perform secondary desulfurization on the sulfur-containing compounds; and (5) the tap water 11 at the inlet of the stainless steel cyclical water tower 12 is connected to the air compressor 6 through the water heater 9, and the outlet of the desulfurization device 5 is connected to the air compressor; when in use, during the long-term and continuous running of the air compressor, electric energy is converted to mechanical energy which is then converted to heat energy; during the conversion of mechanical energy to heat energy, the temperature of the flue gas is increased since the flue gas is continuously high-pressure compressed, and the high-speed rotation and friction of the screw of the air compressor 6 also generate high-temperature heat; those generated heat is taken away from the air compressor by the high-temperature lubricant 7 of the air compressor to be transferred to and heat the tap water 11 in the water heater 9; the hot water is delivered to the stainless steel cyclical water tower 12, the hot water 10 from the outlet of the stainless steel cyclical water tower 12 first enters the dual-layer insulating water tower 13 and is then used for the end use 14; and the high-temperature lubricant 7 is cooled to become the low-temperature lubricant 8 and then flows back to the air compressor 6.

In the present invention, an advanced oxidation technique is used to perform combined denitration and desulfurization on the waste gas to form a nontoxic compound, heat produced after treatment is recovered for energy utilization of other aspects.

The invention claimed is:

1. A denitration and waste heat recovery integrated furnace, comprising a denitration system, a desulfurization system and a waste heat recovery system, the denitration system comprises a boiler (1), an air pre-heater (2) and a denitration device (3); the desulfurization system comprises a desulfurization device (5); and in the waste heat recovery system, an air compressor (6) is connected to a water heater (9), the water heater (9) is connected to a stainless steel cyclical water tower (12), and the stainless steel cyclical water tower (12) is connected to an end use (14) through a dual-layer insulating water tower (13).

2. The denitration and waste heat recovery integrated furnace according to claim 1, characterized in that the boiler (1) in the denitration system is connected to the air pre-heater (2) to allow for heat exchange between flue gas and air, for a purpose of adjustment and control of temperature of the flue gas; and the boiler (1) is also connected to the denitration device (3) in which a denitration process is used.

3. The denitration and waste heat recovery integrated furnace according to claim 1, characterized in that an air outlet of the denitration system is connected to an inlet of a dust collector (4), and an outlet of the dust collector (4) is connected to an air inlet of the desulfurization system.

4. The denitration and waste heat recovery integrated furnace according to claim 1, characterized in that, in the desulfurization device (5) of the desulfurization system, a dry desulfurization process and a wet desulfurization process are used.

5. The denitration and waste heat recovery integrated furnace according to claim 1, characterized in that hot water from an outlet of the stainless steel cyclical water tower (12) first enters the dual-layer insulating water tower (13) and is then used for the end use (14).

6. The denitration and waste heat recovery integrated furnace according to claim 1, characterized in that tap water at an inlet of the stainless steel cyclical water tower (12) is connected to the air compressor (6) through the water heater (9), heat generated by the air compressor (6) is absorbed by a lubricant, and the high-temperature lubricant (7) transfers heat to and heats the tap water (11).

\* \* \* \* \*